Patented Dec. 26, 1922.

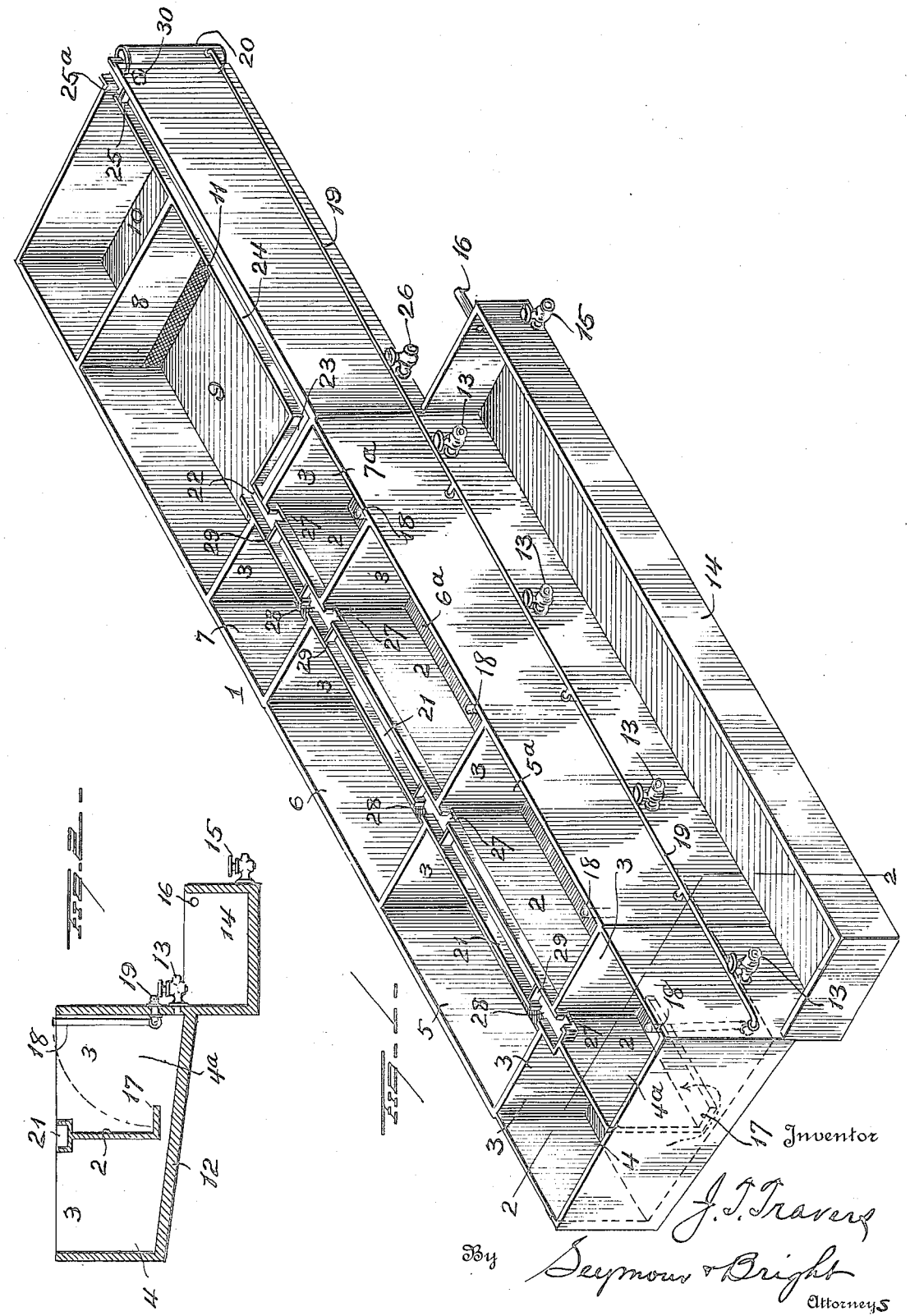
Dec. 26, 1922.
1,440,254
J. T. TRAVERS.
WATER PURIFICATION.
ORIGINAL FILED JUNE 1, 1921.

1,440,254

UNITED STATES PATENT OFFICE.

JOHN T. TRAVERS, OF COLUMBUS, OHIO.

WATER PURIFICATION.

Application filed June 1, 1921, Serial No. 474,153. Renewed September 5, 1922. Serial No. 586,362.

*To all whom it may concern:*

Be it known that I, JOHN T. TRAVERS, a citizen of the United States, and a resident of Columbus, in the county of Franklin and State of Ohio, have invented certain new and useful Improvements in Water Purification; and I do hereby declare the following to be a full, clear, and exact description of the invention, such as will enable others skilled in the art to which it appertains to make and use the same.

This invention relates to improvements in water purification and more particularly to a tank structure to facilitate the precipitation of impurities in the water.

The waste or refuse water from manufacturing and dairy plants contains considerable quantities of organic-solids and if this water be permitted to reach running streams or rivers, it will pollute the waters of the same. Attempts have been made to reduce the extent of pollution of streams with the impure water (which is in effect sewage) issuing from manufacturing plants, by passing such water or sewage through settling tanks of large size. This has not only failed adequately to purify the sewage, but on account of the size of such tanks, they are expensive to build and satisfactorily maintain.

One object of my invention is to obviate the use of large precipitation or settling tanks, and to provide a precipitation tank construction which may be comparatively small in size, and cause such a slow passage of sewage through the same, especially when the sewage has a precipitant mixed therewith, that the water will be so thoroughly treated that the organic impurities will effectually be precipitated and thus prevented from reaching and polluting running streams into which the treated water may finally flow.

With this and other objects in view, the invention consists in certain novel features of construction and combinations of parts as hereinafter set forth and pointed out in the claims.

In the accompanying drawings, Figure 1 is a view in perspective showing an embodiment of my invention; and Figure 2 is a transverse sectional view on the line 2—2 of Figure 1.

My improved tank 1 may be elongated in form and is divided by a longitudinal partition 2 which may be centrally located, and by transverse partitions 3 whereby a plurality of pairs of chambers 4—4$^a$, 5—5$^a$, 6—6$^a$ and 7—7$^a$ are formed. A portion of the tank is also divided by a transverse partition 8 into two chambers or compartments 9—10 extending from side to side of the tank. The partition 8 terminates at its lower edge above the bottom of the tank and the space thus formed is covered by a screen 11. The chambers 4, 5, 6 and 7 may conveniently be termed "inlet chambers" and the chambers 4$^a$, 5$^a$, 6$^a$ and 7$^a$ are precipitation chambers. Each section of the partition 2 terminates at its lower end above the inclined bottom 12 which extends from one side wall of the tank to the other and serves to direct sludge to a valved gate 13, one of such gates being provided for each of the several precipitation chambers 4$^a$, 5$^a$, 6$^a$, 7$^a$, and these valved gates may discharge into a sludge trough 14,—the latter being provided with a valved gate 15 and a water outlet 16.

By terminating the sections of the longitudinal partitions 2 above the inclined bottom 12, the inlet chambers 4—7 are caused to communicate at their lower ends with the lower portions of the precipitation chambers 4$^a$—7$^a$ and in order that the fluid passing from the inlet chambers 4—7 may be directed toward the lower central portions of the precipitation chambers 4$^a$—7$^a$, the partition sections 2 are provided with lateral extensions 17 entering the precipitation chambers over the inclined bottom 12.

Each precipitation chamber may be provided therein with a drain pipe 18, and the several pipes 18 may be connected, by a pipe 19 (common to all of them) with a water discharge or overflow pipe 20 located at the forward end of the tank. Each drain pipe 18 is normally so disposed that its upper open end will be above the maximum height of the water level but it is so adjustably mounted that (in the event it becomes necessary or desirable to withdraw treated water from any one of the precipitation chambers), the said drain pipe may be turned downwardly so that its open end will become submerged, as indicated by the dotted line in Figure 2.

Disposed over the longitudinal partition 2 and extending across the transverse partitions 3 is a trough 21, one end of which is closed near one end of the tank and the other end of this trough is adapted to discharge into the chamber 9, such discharge being controlled by a gate 22. The trough is provided with a lateral extension 23 and the latter communicates with a forward trough extension 24 near one side wall of the tank, said trough extension 24 being adapted to discharge into the overflow pipe 20. Normally, water from the main portion 21 of the trough will discharge directly into the chamber 9, but should it become desirable to drain the chambers 9 and 10, the discharge end of the trough 21 will be closed and communication between said trough 21 and the lateral trough extension 23 will be opened by manipulation of the gate 22, a gate 25 which controls communication of the chamber 10 with the trough extension 24 through an inlet 25$^a$ being also closed. The chambers 9 and 10 may now be drained by means of a valved gate 26 which communicates with the chamber 9. The trough 21 is provided in one side with inlets 27 communicating with the several precipitation chambers 4$^a$—7$^a$ and in the other side of said trough, outlets 28 are provided for the inlet chambers 5, 6, 7. Gates 29 are located in the trough 21 and are normally so disposed that water or sewage entering the trough from one of the precipitation chambers will be directed to and discharged into the inlet chamber which communicates with the next precipitation chamber.

The liquid to be treated will have mixed therewith a suitable precipitant, such for example, as a marl-clay composition, and discharged into the first inlet chamber 4, by which it will be conducted to and discharged into the bottom portion of the precipitation chamber 4$^a$. The sewage will accumulate in this chamber and the precipitant will cause solid organic matter to be precipitated to the bottom thereof, and any undissolved precipitant and accumulated sludge in the bottom of said chamber will act as a filtering media for the liquid. When the height of the liquid in the chamber 4$^a$ reaches the inlet of the trough near the top of said chamber, the liquid will flow into the trough and be conveyed by the latter to the adjacent outlet 28 through which it will flow to the next inlet chamber (5) by which it will be directed into the bottom portion of the chamber 5$^a$ where the same treatment will take place. The liquid will in this manner be caused to flow through the several precipitating chambers and inlet chambers successively and from the last precipitation chamber 7$^a$ of the series, the liquid will flow from the forward end of the trough into the larger compartment 9, from which latter it will pass, through the screen 11 to the compartment 10 and from the latter, the treated water, deprived of the polluting elements contained in the sewage, will pass into the trough extension 24 through the inlet 25$^a$ and will finally be discharged from said trough extension into the overflow or discharge pipe 20. If desired, the chamber 10 may also be closed to communicate with the pipe 20 by means of a short pipe 30.

If, for any reason, it becomes desirable to cut out one or more of the precipitation chambers and the inlet chamber associated with the same, without interfering with the flow through the other chambers, this may readily be accomplished by manipulation of gates in the trough 21.

With the use of my improvements, sludge may be withdrawn from any of the precipitation chambers without interrupting the flow of liquid.

While I have shown four precipitation chambers and associated inlet chambers, it is evident that a greater or a less number may be employed and the trough 21 modified accordingly.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In apparatus of the character described, the combination with a tank provided with a plurality of precipitation chambers, an inlet chamber communicating with each precipitation chamber, and means for causing liquid to pass from the upper portion of one precipitation chamber to the upper portion of the inlet chamber of a succeeding precipitation chamber.

2. In apparatus of the character described, the combination of a tank having partitions forming a series of precipitation chambers and inlet chambers communicating at their lower ends with said precipitation chambers respectively, conveying means for conducting liquid from the upper portion of one precipitation chamber, the inlet chamber which communicates with a precipitation chamber in advance of the first mentioned precipitation chamber, and means for straining the liquid after the same leaves the last precipitation chamber.

3. In apparatus of the character described, the combination of a tank having a plurality of precipitation chambers and inlet chambers communicating with said precipitation chambers respectively, means for conducting liquid from the upper portion of one precipitation chamber to the upper end of an inlet chamber which communicates with another of said precipitation chambers in advance of the first-mentioned precipitation chamber, and means whereby any one or more of said precipitation chambers and the inlet chamber communicating therewith may be excluded from service.

4. In apparatus of the character described, the combination of a tank having partitions forming a series of precipitation chambers and inlet chambers communicating at their lower ends with said precipitation chambers respectively, a trough near the upper portion of the tank communicating with the upper portions of said precipitation chambers and said inlet chambers and means for causing liquid entering the trough from one precipitation chamber to flow into the upper portion of the inlet chamber which communicates with another precipitation chamber in advance of the first-mentioned precipitation chamber.

5. In apparatus of the character described, the combination of a tank having partitions forming a series of precipitation chambers and a series of inlet chambers communicating at their lower ends with said precipitation chambers, a trough near the upper portion of the tank having inlets to communicate with the upper portions of said precipitation chambers and outlets to communicate with the upper portions of said inlet chambers, and gates for said inlets and outlets, said gates being operable to cause liquid entering the trough from the upper portion of one precipitation chamber to be discharged into the upper portions of an inlet chamber in advance of the first-mentioned precipitation chamber which communicates with another precipitation chamber, said gates being also operable to close communication with the upper portion of one or more of said inlet chambers and the upper portion of the precipitation chamber or chambers communicating therewith whereby any one or more of said precipitation chambers and communicating inlet chambers may be cut out of service.

6. In apparatus of the character described, the combination of a tank having a plurality of precipitation chambers, means for discharging liquid into the lower portions of said chambers successively, said tank having two other chambers to receive liquid from one of said precipitation chambers and separated by a partition having a screened passage connecting the lower portions of said other chambers and an overflow outlet for treated water communicating with one of said other chambers.

7. In apparatus of the character described, the combination of a tank having a plurality of communicating precipitation chambers, means for conveying liquid from the upper portion of one chamber to the lower portion of another chamber said tank having a chamber to receive treated water from the precipitation chambers, means for discharging treated water from the treated-water chamber, means for draining said last-mentioned chamber, means for draining the precipitation chambers, and means for discharging sludge from each of the precipitation chambers.

8. In apparatus of the character described, the combination of a tank having a plurality of precipitation chambers and inlet chambers communicating with the precipitation chambers respectively, the dividing walls between the inlet chambers and the precipitation chambers provided at their lower end portions with extensions disposed over a portion of the bottoms of the precipitation chambers.

9. In apparatus of the character described, the combination of a tank having a plurality of precipitation chambers having inclined bottoms, valved sludge outlets near the low portion of each inclined bottom, a trough into which said sludge outlets may discharge, means for causing liquid to flow from the upper portion of one precipitation chamber to the lower portion of another precipitation chamber, means for withdrawing water from the precipitation chambers independently of the discharge of sludge from said chambers and means for permitting discharge of treated liquid from the tank.

10. In apparatus of the character described, the combination of a tank divided to provide a plurality of precipitation chambers, and inlet chambers communicating with the precipitation chambers said tank also having two communicating chambers for treated water, a trough communicating with the inlet and precipitation chambers, gates to control such communication whereby liquid may be caused to pass from one precipitation chamber to the inlet chamber which communicates with another precipitation chamber, a lateral trough extension to communicate with one end of said trough, a gate to control passage of water from one end of said trough to one of the treated water chambers or to said lateral trough extension, a forward trough extension communicating with said lateral trough extension and adapted to discharge treated liquid, and means for controlling the passage of liquid from one of said treated water chambers to said forward trough extension.

11. In apparatus of the character described, the combination of a tank having a plurality of precipitation chambers and communicating inlet chambers, means for conducting water from the upper portion of a precipitation chamber to the upper portion of an inlet chamber which communicates with another precipitation chamber, in advance of the last mentioned precipitation chamber, said tank having communicating chambers for treated water, a discharge pipe to receive treated water form said last-mentioned chambers, adjustable drain devices in the precipitation chambers, a pipe common to said drain devices and communicating with said discharge pipe, and means for draining the treated water chambers.

In testimony whereof, I have signed this specification in the presence of two subscribing witnesses.

JOHN T. TRAVERS.

Witnesses:
 E. N. HUGGINS,
 W. H. LIGGETT.